Feb. 17, 1959 E. A. LILLEY 2,874,229

TELEPHONE

Filed March 26, 1957

INVENTOR.

ESTHER A. LILLEY

BY Victor J. Evans & Co.

ATTORNEYS

United States Patent Office 2,874,229

Patented Feb. 17, 1959

2,874,229

TELEPHONE

Esther A. Lilley, Port Richey, Fla.

Application March 26, 1957, Serial No. 648,546

2 Claims. (Cl. 179—103)

This invention relates to a telephone, and more particularly to a telephone which permits several persons to make use of the telephone simultaneously.

The object of the invention is to provide a telephone which is constructed so that several persons can simultaneously talk over and listen to the telephone.

Another object of the invention is to provide a telephone which is constructed so that it includes a pair of sound receiving units as well as a pair of sound transmitting units so that one telephone can be used by a plurality of different people at the same time.

A further object of the invention is to provide a telephone which is extremely simple and inexpensive to manufacture.

Other objects and advantages will be apparent during the course of the following description.

In the accompanying drawings, forming a part of this application, and in which like numerals are used to designate like parts throughout the same.

Figures 1, 2, 3:
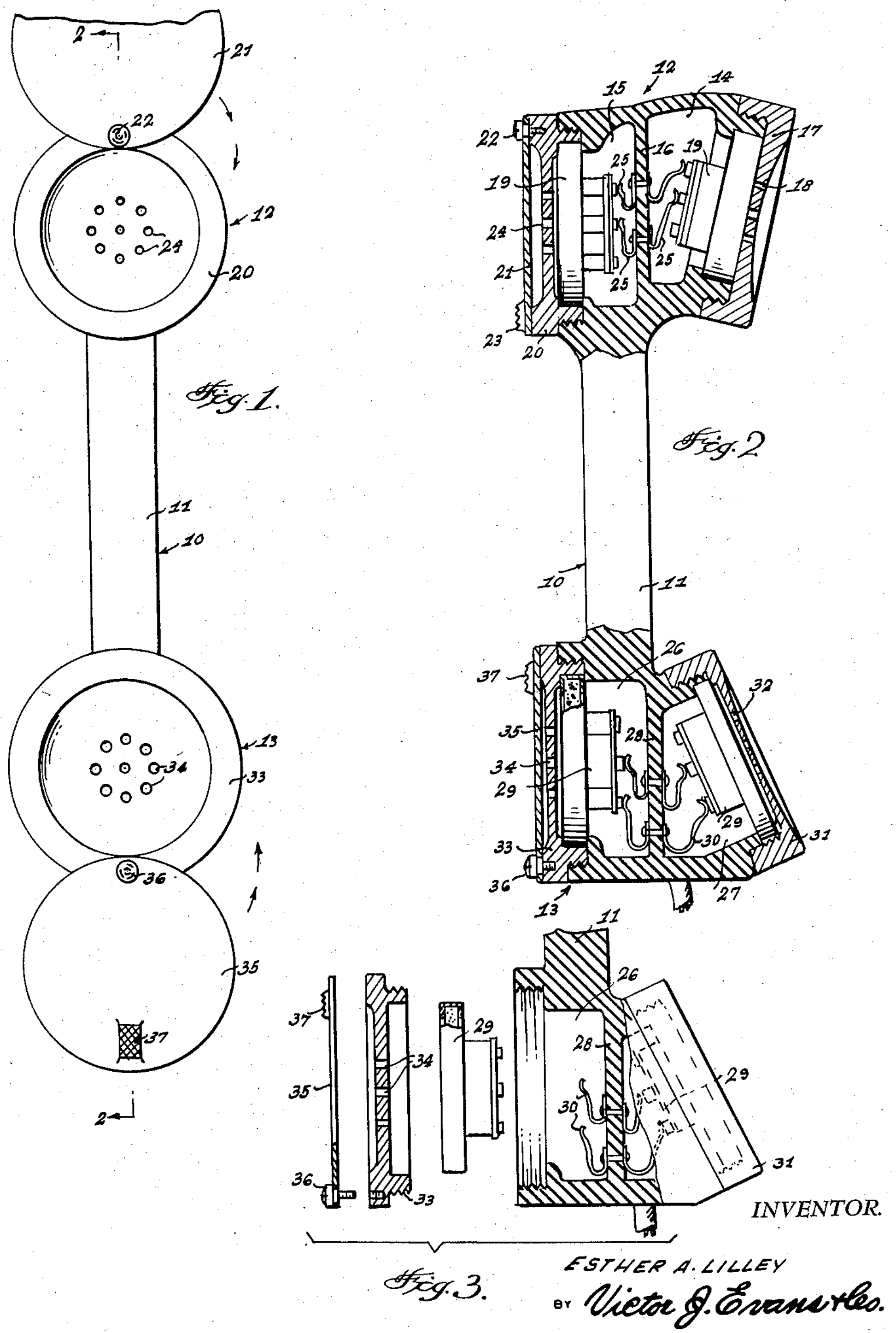
Figure 1 is a fragmentary elevational view of the telephone, constructed according to the present invention and showing the covers moved to open position.
Figure 2 is a sectional view taken on the line 2—2 of Figure 1.
Figure 3 is a fragmentary sectional view showing certain constructional details of the device in disassembled position.

Referring in detail to the drawings, the numeral 10 indicates the telephone of the present invention which includes a body portion 11 that defines a handle, and arranged on one end of the body portion is a sound receiving means which is indicated generally by the numeral 12, while arranged on the other end of the body portion is a sound transmitting means which is indicated generally by the numeral 13.

As shown in Figure 2, the sound receiving means 12 includes a pair of compartments 14 and 15 which are separated by a partition 16. A closure member 17 is provided for the compartment 14 and the closure member 17 includes the usual apertures or openings 18. Positioned in each of the compartments 14 and 15 is a conventional sound receiver unit 19. A closure 20 is provided for the compartment 15, and the closure 20 has apertures 24 therein. There is further provided a cover 21 which is mounted for movement into and out of closing or covering relation with respect to the element 20, and the cover 21 is pivotally connected to the closure 20 by means of a pivot pin 22. A finger engaging portion 23 extends outwardly from the cover 21 whereby the cover 21 can be manually moved so as to permit dual use of the telephone when desired. When the cover 21 is in closing relation with respect to the member 20, dirt, or dust or other foreign matter will be prevented from entering the compartment 15 and interfering with the mechanism therein.

The sound transmitting mechanism 13 includes a head portion which is provided with a pair of chambers 26 and 27 that are separated by a partition 28. A microphone or sound transmitting unit 19 is positioned in each of the chambers 26 and 27, and the units 29 are electrically connected together by means of wires 30. Similarly, the units 19 are electrically connected together by means of wires 25.

A closure member 31 is provided for the compartment 27, and the closure member 31 is provided with the usual openings or apertures 32, whereby a person speaking into the telephone can have his or her voice transmitted in the usual manner by means of the transmitter 29. A closure member 33 is provided for the other compartment or chamber 26, and the closure member 33 has apertures 34 therein. A cover 35 is hingedly connected to the closure member 33 by means of a pivot pin or hinge pin 36, and a finger engaging portion 37 extends from the cover 35 for use in manually moving this cover.

From the foregoing, it is apparent that there has been provided a telephone which is constructed so that more than one person can use the telephone at the same time. In use, when the telephone is being used in the normal manner by one person, the lids or covers 21 and 35 are in their closed position with respect to the closures 20 and 33 so that a person places the closure 17 against his or her ear and speaks into the unit 29 which is mounted in the chamber 27. Then, in the event that another person or individual desires to simultaneously use the telephone, it is only necessary to manually pivot the covers 21 and 35 to the position shown in Figure 1 from the position shown in Figure 2 so that one person can have his or her ear against the closure 17, while the other person's ear can be arranged against the closure 20. At the same time, one person can speak to the transmitting unit 29 in the chamber 27, while the other person can speak into the transmitting unit 29 in the other chamber 26. Thus, two people can hear and speak into the telephone simultaneously so that it is not necessary to pass the telephone back and forth between several individuals who desire to participate in a particular conversation with a third party.

The telephone is constructed so that it can be conveniently gripped in the hand and wherein the sound receiving means and sound transmitting means are located so that they are readily accessible to the several persons who may use the telephone. The covers 35 and 21 can be readily manually moved into and out of closed or open position depending upon whether one or two persons are using the phone. By means of the covers 21 and 35, when the second transmitter or receiver is not required, the dust, lint or other foreign matter will be prevented from interfering with the mechanism therein.

The present invention is especially suitable for use by persons who cannot afford more than one telephone in a building such as a home and wherein such persons may have friends or relatives in schools, colleges or other far off places, since the present invention will permit persons to conveniently and economically keep in touch with each other and wherein several persons will be given the opportunity to converse at one time over long distance and this will result in a saving in time in switching the phone back and forth from one member of the family to another or from one person to another. Thus, the telephone of the present invention is in the form of a two-way speaking and listening system. Thus, the device will result in a saving of precious or expensive phone time and will also provide the added convenience of permitting several persons to simultaneously participate in the phone conversation.

I claim:

1. In a telephone, a body portion, sound receiving means on one end of said body portion, sound transmitting means on the other end of said body portion, said sound receiving means comprising a head having a partition therein defining first and second compartments, a receiver unit positioned in each of said compartments and said receiver units being arranged contiguous to each other, means electrically connecting said receiver units together, an apertured closure for each of said compartments, a cover pivotally connected to one of said closures, a finger engaging portion on said cover, said sound transmitting means comprising a pair of chambers, a partition interposed between said pair of chambers, a transmitter unit positioned in each of said chambers, means electrically connecting said transmitter units together, an apertured closure for each of said chambers, a cover pivotally connected to one of said last named closures, and a finger engaging portion on said last named cover.

2. In a telephone, a body portion defining a handle, sound receiving means on one end of said body portion, sound transmitting means on the other end of said body portion, said sound receiving means comprising a head having a partition therein defining first and second compartments, a receiver unit positioned in each of said compartments and said receiver units being arranged contiguous to each other, means electrically connecting said receiver units together, an apertured closure for each of said compartments, a cover pivotally connected to one of said closures, said cover being mounted for movement into and out of closing relation with respect to the adjacent closure, a finger engaging portion extending outwardly from said cover whereby the cover can be manually moved so as to permit dual use of the telephone when desired, and whereby when the cover is in closing relation with respect to the closure, dirt, dust or other foreign matter will be prevented from entering the compartment, said sound transmitting means comprising a pair of chambers, a partition interposed between said pair of chambers, a transmitter unit positioned in each of said chambers, means electrically connecting said transmitter units together, an apertured closure for each of said chambers, a cover pivotally connected to one of said last named closures, and a finger engaging portion on said last named cover for use in manually moving this last named cover.

References Cited in the file of this patent

UNITED STATES PATENTS

| | | |
|---|---|---|
| 1,086,832 | Manson | Feb. 10, 1914 |
| 1,533,193 | Kelsay | Apr. 14, 1925 |
| 2,277,907 | Goodale et al. | Mar. 31, 1942 |
| 2,620,891 | Keap | Dec. 9, 1952 |

FOREIGN PATENTS

| | | |
|---|---|---|
| 640,068 | Germany | Dec. 19, 1936 |